(12) United States Patent
Balachandran

(10) Patent No.: US 10,671,415 B2
(45) Date of Patent: Jun. 2, 2020

(54) CONTEXTUAL INSIGHT GENERATION AND SURFACING ON BEHALF OF A USER

(71) Applicant: Microsoft Technology Licensing, LLC, Redmond, WA (US)

(72) Inventor: Anand Balachandran, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 111 days.

(21) Appl. No.: 15/988,867

(22) Filed: May 24, 2018

(65) Prior Publication Data

US 2019/0361720 A1 Nov. 28, 2019

(51) Int. Cl.
| | |
|---|---|
| *G06F 9/451* | (2018.01) |
| *G06F 3/0481* | (2013.01) |
| *G06N 20/00* | (2019.01) |
| *G06F 40/232* | (2020.01) |
| *G06F 40/242* | (2020.01) |
| *G06F 40/253* | (2020.01) |

(52) U.S. Cl.
CPC ............ *G06F 9/453* (2018.02); *G06F 3/0481* (2013.01); *G06F 40/232* (2020.01); *G06F 40/242* (2020.01); *G06F 40/253* (2020.01); *G06N 20/00* (2019.01)

(58) Field of Classification Search
CPC ....................................................... G06F 9/453
USPC ........................................................ 715/707
See application file for complete search history.

(56) References Cited

U.S. PATENT DOCUMENTS

| | | | | |
|---|---|---|---|---|
| 9,354,958 | B2* | 5/2016 | Amendjian | G06F 16/9558 |
| 9,619,250 | B2* | 4/2017 | Gentile | G06F 3/04847 |
| 10,346,285 | B2* | 7/2019 | Baer | G06F 11/302 |
| 10,484,437 | B2* | 11/2019 | Banyai | G06F 9/453 |
| 2012/0297294 | A1* | 11/2012 | Scott | G06F 17/273 715/261 |
| 2015/0040006 | A1* | 2/2015 | Gentile | G06F 3/0482 715/708 |
| 2015/0199229 | A1* | 7/2015 | Amendjian | G06F 16/9558 714/57 |
| 2017/0220360 | A1* | 8/2017 | Chiba | G06F 40/109 |
| 2017/0220536 | A1* | 8/2017 | Chiba | G06F 17/24 |

* cited by examiner

*Primary Examiner* — William D Titcomb

(57) ABSTRACT

Non-limiting examples of the present disclosure relate to generation and surfacing of user-specific contextual insights from analysis of telemetry data that is associated with user interaction with an exemplary application/service. Processing operations described herein extend to generation of any type of contextual insights from any type of telemetry data. In one example, user-specific contextual insights are generated to provide users with writing assistance to digital documents created through exemplary applications/services. A user interface is presented through a productivity service. Writing assistance telemetry data, associated with one or more users, is analyzed. Writing assistance telemetry data comprises, data evaluating, for the user(s), spelling, grammar and a writing style across content of one or more digital documents. User-specific insight analytics are generated for the user(s) based on analysis of the writing telemetry data. The user interface is adapted to present the generated user-specific contextual insights for the user.

20 Claims, 8 Drawing Sheets

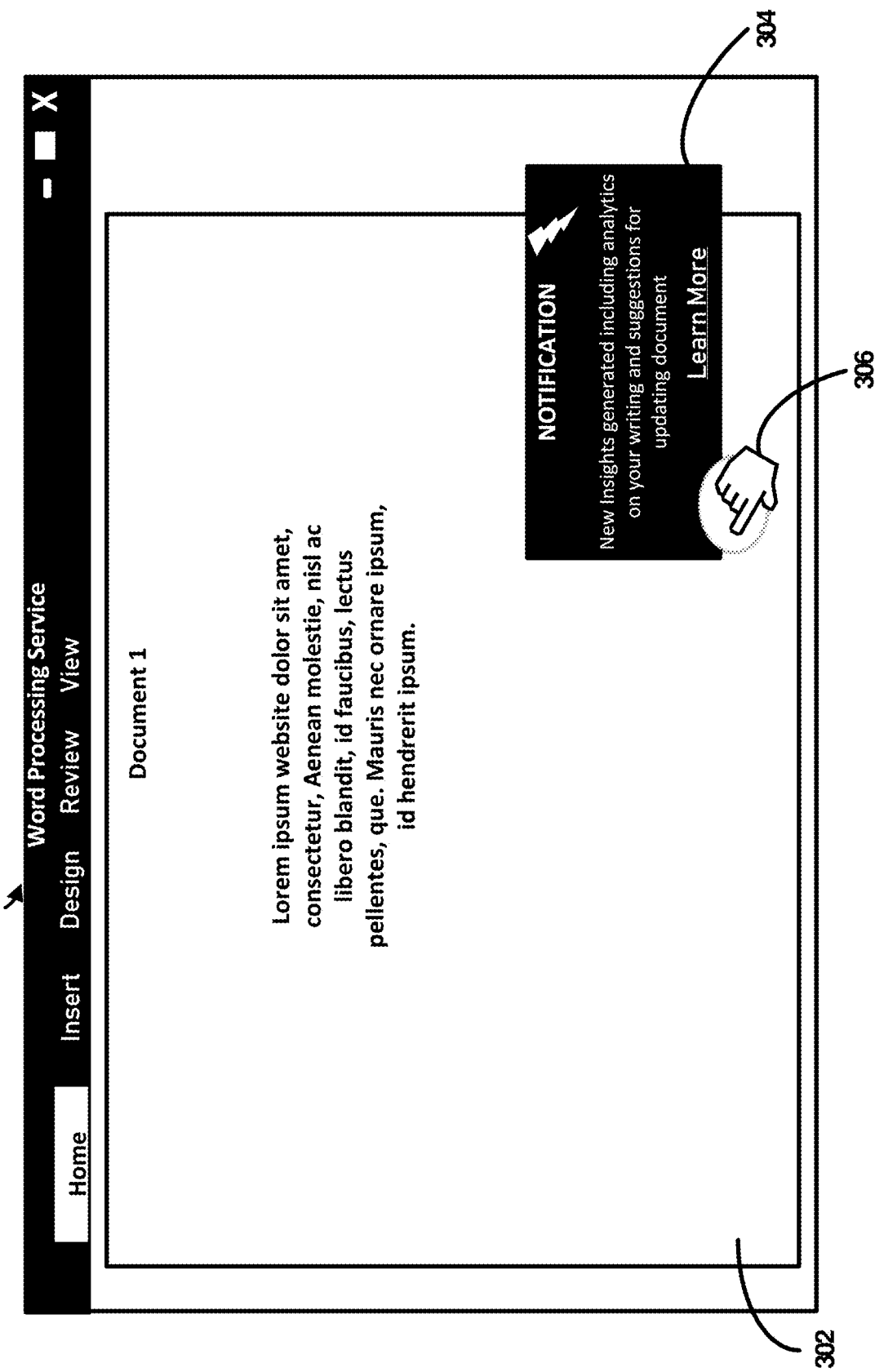

FIGURE 3B

Word Processing Service — □ X

Review

Document 1

Lorem ipsum website dolor sit amet, consectetur, Aenean molestie, nisl ac libero blandit, id faucibus, lectus pellentes, que. Mauris nec ornare ipsum, id hendrerit ipsum.

INSIGHTS ∨ X

Check Document

23 Results

CORRECTIONS
- 9 Spelling
- 5 Grammar

14

IMPROVEMENTS
- 4 Clarity and Conciseness
- 2 Formal Language
- 1 Punctuation
- 2 Vocabulary Choice

9

Good to know...

New Words
You've contributed 25 new words to your organization's dictionary

15 New Words

Learn More 320
322
324
326
328
302

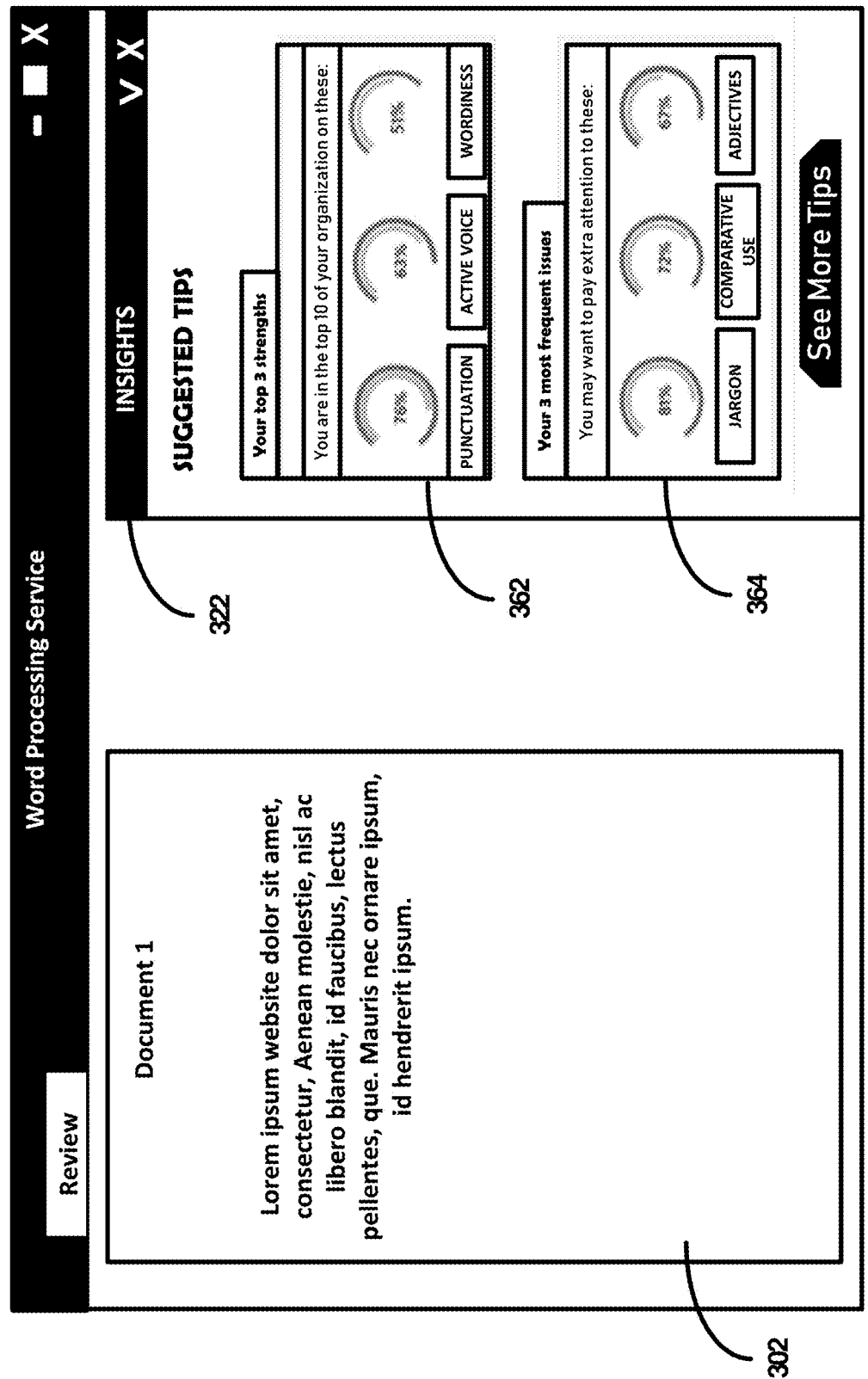

CONTEXTUAL INSIGHT GENERATION AND SURFACING ON BEHALF OF A USER

BACKGROUND

Applications, such as word processing applications, commonly provide review assistance that a user may utilize to edit content that is produced. For instance, basic spelling and grammar proof reading and auto-correction features are available for users to enhance their content. However, users do not automatically know or appreciate the value of advanced writing assistance. Consider an example where a user commonly makes a spelling error that is auto-corrected in multiple different documents that the user authors. The user may be relying on auto-correct and not realizing the common error, which leads the user to continue to make similar errors. From an efficiency standpoint, the use of an auto-correct feature also masks the amount of time the user saves while editing a document. This leads to poorer quality authored content as well as inefficiency for operation of applications/services and associated computing devices, for example, where additional processing cycles, operations etc., are needed to correct such errors as well as a need for more bandwidth/computing resources and creation of latency during processing.

Additionally, traditional user interfaces are not configured to provide contextual insights (e.g., advanced writing assistance) on content that is produced by a user. Further problems exist where users do not tend to share knowledge, tips, etc. with other users. Typically, this is because user interfaces are not configured to make it easier for users to share knowledge with other users.

SUMMARY

In view of the foregoing technical problems, non-limiting examples of the present disclosure relate to generation and surfacing of user-specific contextual insights from analysis of telemetry data that is associated with user interaction with an exemplary application/service. Processing operations described herein extend to generation of any type of contextual insights from any type of telemetry data without departing from the spirit of the present disclosure. In one example, user-specific contextual insights are generated to provide users with writing assistance such as improving spelling, grammar and writing style of digital documents created through exemplary applications/services. For instance, a user interface is presented through a productivity service. Writing assistance telemetry data, associated with one or more users, is analyzed. Writing assistance telemetry data comprises, evaluating, for the user(s), spelling, grammar and a writing style across content of one or more digital documents. User-specific insight analytics are generated for the user(s) based on analysis of the writing telemetry data. The user interface is adapted to present the generated user-specific contextual insights automatically on behalf of the user. Operation and productivity of an exemplary application/service is enhanced through provision of contextual insights as well as the adaption of a user interface of the application/service to present the contextual insights.

In further examples, an exemplary application/service, through an adapted user interface, is configured to incentivize users to share contextual insights with other users. As an example, gamification processing may be implemented across exemplary applications/services that rewards users for proficiency in writing and grammar as well as taking actions that further contextual insight generation. Examples of actions that may result in a user earning rewards may comprise but are not limited to: adding content to online repositories, dictionaries, etc.; generation of contextual insights from user content and/or user behaviors; sharing insights with other users; utilizing insights provided by other users; and improving spelling, grammar and/or writing style across digital documents of a user, among other examples. In other instances, rewards may be retrieval for application/service upgrades, subscriptions, unlocking of achievements, medals, badges, etc., among other examples.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 3A-3E illustrate exemplary processing device views providing user interface examples of a productivity service that comprises user interface features for user-specific contextual insights, with which aspects of the present disclosure may be practiced.

DETAILED DESCRIPTION

Figure 1:
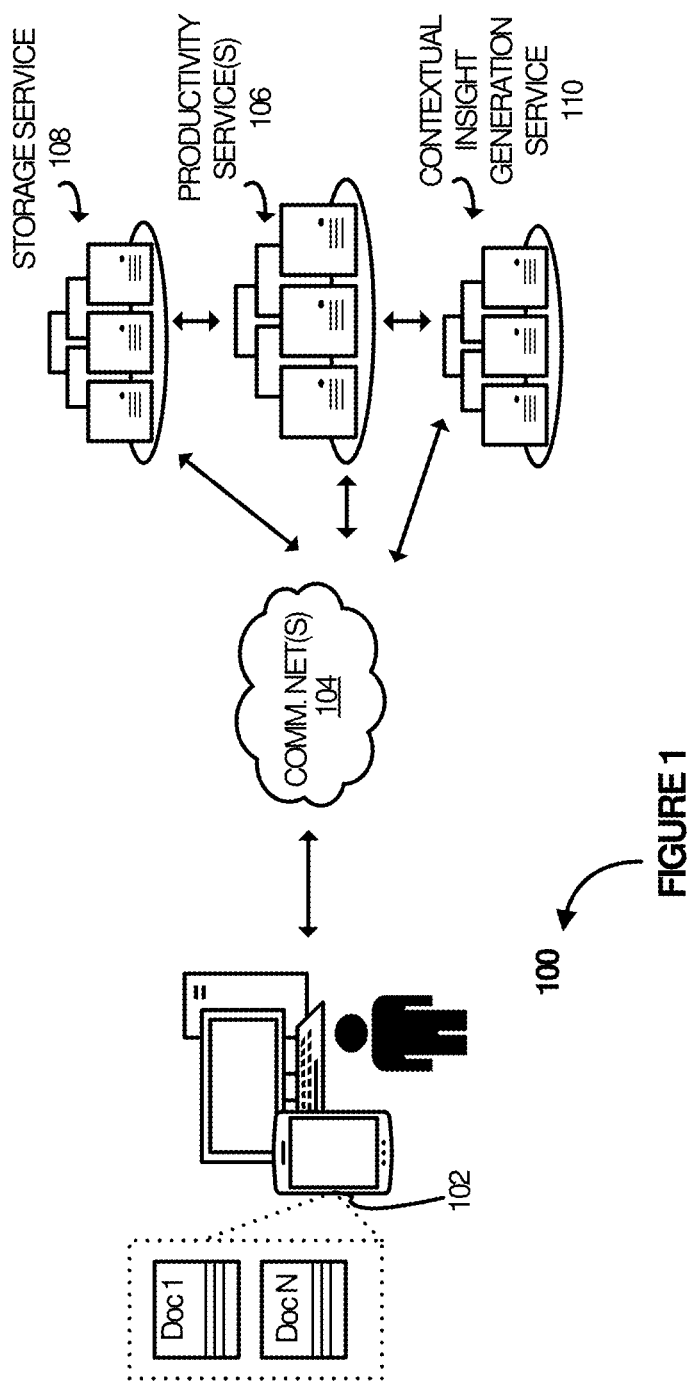
FIG. 1 illustrates an exemplary process flow for generation of exemplary user-specific contextual insights, with which aspects of the present disclosure may be practiced.

Non-limiting examples of the present disclosure relate to generation and surfacing of user-specific contextual insights from analysis of telemetry data that is associated with user interaction with an exemplary application/service. Processing operations described herein extend to generation of any type of contextual insights from any type of telemetry data without departing from the spirit of the present disclosure. In one example, user-specific contextual insights are generated to provide users with writing assistance such as improving spelling, grammar and writing style of digital documents created through exemplary applications/services. For instance, a user interface is presented through a productivity service. Writing assistance telemetry data, associated with one or more users, is analyzed. Writing assistance telemetry data comprises, evaluating, for the user(s), spelling, grammar and a writing style across content of one or more digital documents. User-specific insight analytics are generated for the user(s) based on analysis of the writing telemetry data. The user interface is adapted to present the generated user-specific insight analytics automatically on behalf of the user. Operation and productivity of an exemplary application/service is enhanced through provision of contextual insights as well as the adaption of a user interface of the application/service to present the contextual insights.

For ease of understanding, subsequent non-limiting examples described herein may reference generation and surfacing of contextual insights that provide writing assistance to users. As referenced above, user-specific contextual insights are generated to provide users with writing assistance such as improving spelling, grammar and writing style of digital documents created through exemplary applications/services. User-specific contextual insights comprise data and analytics that provide the user with an intuitive and deeper understanding of the content that they generate. Exemplary contextual insights may be generated across one or more digital documents of the user, a group/team of users and types of applications/services, among other examples. In one example, contextual insights may be generated that represent proficiency scoring of user's writing habits to help users get an understanding of their strengths, weaknesses and patterns in their writing. Moreover, exemplary user-specific contextual insights may be generated for specific time durations (e.g., documents in the last day, week, month, year), where an exemplary representation of a user interface pane or menu for generated insights may comprise insights and analytics for different time durations across digital documents of the user. As an example, contextual insights may be generated and presented that highlight top errors/corrections over a certain pre-defined duration of time. In further instances, exemplary contextual insights may provide comparative analytics, which may compare a user's writing style, spelling, grammar, etc., with that of other users of an application/service. For example, a user may be a member of a group/team of users, where exemplary writing assistance telemetry data may be used to identify strengths and weaknesses of users as compared with other members of a group/team. In additional examples, exemplary contextual insights may be generated from analysis of writing assistance telemetry data across a plurality of users, for example, to determine common best practices across users of an application/service, team of users or organization, among other examples. Such insights may be shared with other users across the application/service or other applications/services associated with an application platform. Further, visual examples of user-specific contextual insights are provided in FIGS. 3A-3E, which provide examples of an adapted and improved graphical user interface (GUI).

User-specific contextual insights may be generated in real-time or near real-time. In one example, user-specific contextual insights are generated while a user is offline and presented through a user interface of an application/service when the user returns online. In another example, user-specific contextual insights are generated while the user is actively engaging an application/service. For instance, user-specific contextual insights may be generated for a digital document that a user is accessing through an exemplary application/service. Presentation of exemplary user-specific contextual insights may occur through any of a plurality of different triggers. In one example, presentation of exemplary user-specific contextual insights occurs automatically, on behalf of a user, when a digital document is displayed through a user interface of an application/service. In another example, presentation of exemplary user-specific contextual insights occurs automatically, on behalf of a user, when an update to content of a digital document is detected. In yet another example, a user may select, through a user interface of an application/service, an application control feature for execution of a review action (e.g., spelling and grammar check, proofreading, online dictionary or thesaurus access, comments, track changes), where presentation of exemplary user-specific contextual insights occurs automatically, on behalf of a user, when the selection of the review action is detected. In some examples, an exemplary user interface is configured to provide a user with a notification that indicates to the user that user-specific insight analytics have been generated. In such examples, an action associated with selection of the notification may be a trigger for presentation of the user-specific contextual insights. In one example, exemplary user-specific contextual insights are presented through a pop-up user interface pane in a user interface of an application/service. In alternative instances, user-specific contextual insights may be individually presented, for example, as pop-up notifications, callout user interface features, etc.

In further examples, an exemplary application/service, through an adapted user interface, is configured to incentive users to improve their writing style as well as share contextual insights with other users. As an example, gamification processing may be implemented across exemplary applications/services that rewards users for proficiency in writing and grammar as well as taking actions that further contextual insight generation. Gamification for advanced writing analysis aims to celebrate users' good writing skills and help them leverage the best writing habits of their peers. In some examples, rewards may be issued to a user, for example, based on actions by the user. Examples of actions that may result in a user earning rewards may comprise but are not limited to: earning high proficiency scoring with respect to spelling, grammar and user writing style; adding content to online repositories, dictionaries, etc.; generation of contextual insights from user content and/or user behaviors; sharing insights with other users; utilizing insights provided by other users; and improving spelling, grammar and/or writing style across digital documents of a user, among other examples. In one example, gamification comprises ranking users in comparison with other users of an application/service including with specific groupings (e.g., team-specific, age specific, within specific durations of time). In other instances, rewards may be retrieved for purposes such as application/service upgrades, subscriptions, unlocking of achievements, medals, badges and being prominently displayed and recognized across an application/service, among other examples.

The present disclosure addresses the above technical problems that exist with traditional writing assistance functionality of applications/services. Traditional writing assistance functionality is limited and does not provide the capability of advanced writing assistance. This leads to poorer quality authored content as well as inefficiency for operation of applications/services and associated computing devices while a user is authoring content, for example, where a user may be accessing a plurality of different applications/services and using excess computing resources and bandwidth to resolve writing deficiencies. In the present disclosure, user interfaces of exemplary applications/services are adapted to enable advanced writing assistance through the generation and presentation of user-specific contextual insights. Additionally, system/service examples described herein enable more efficient operation, at run-time, for computing devices that are used to access exemplary applications/services. Exemplary technical advantages provided by processing described in the present disclosure include but are not limited to: generation of user-specific contextual insights; an improved user interface of applications/services that is configured to present exemplary user-specific contextual insights; automatic provision of advanced writing assistance that is more efficient, faster and more accurate than a user's manual attempt for review/editing; generation and deployment of trained machine learning modeling for generation and filtering of user-specific contextual insights; improved processing efficiency (e.g., reduction in processing cycles and better resource management) for computing devices executing processing operations described herein, for example, through service-based integration of resources of an application platform; and improved system/service examples that extend capabilities and functionality of associated applications/services, among other technical advantages.

FIG. 1 illustrates an exemplary process flow 100 for generation of exemplary user-specific contextual insights, with which aspects of the present disclosure may be practiced. As an example, components of process flow 100 may be executed by an exemplary computing system (or computing systems) as described in the description of FIG. 4. Exemplary components, described in process flow 100, may be hardware and/or software components, which are programmed to execute processing operations described herein. In one example, components of process flow 100 may each be one or more computing devices associated with execution of a specific service. Exemplary services may be managed by an application platform that also provides, to a component, access to and knowledge of other components that are associated with applications/services. In one instance, processing operations described in process flow 100 may be implemented by one or more components connected over a distributed network. Operations performed in process flow 100 may correspond to operations executed by a system and/or service that execute computer programs, application programming interfaces (APIs), neural networks or machine-learning processing, language understanding processing, search and filtering processing, and generation of content for presentation through a user interface of an application/service, among other examples.

Process flow 100 begin at an interaction 102 with a user computing device (e.g., client computing device), where a user is accessing an exemplary application/service. An example of a user computing device is a computing system (or computing systems) as described in the description of FIG. 4. A user may connect to an application/service through any number of different device modalities. For instance, a user may connect to an application/service through different computing devices, where non-limiting examples of such are: a smart phone, a laptop, a tablet, a desktop computer, gaming devices, wearable devices and any other suitable computing device, of which computing system of FIG. 4 may be broadly representative.

In interaction 102, a user may connect to an exemplary application/service through a network connection that is accessed via the user computing device. The network connection is reached through an exemplary communication network 104 or networks and in accordance with various communication protocols, combinations of protocols, or variations thereof as known to one skilled in the field of art. Examples of a communication network 104 include intranets, internets, the Internet, local area networks, wide area networks, wireless networks, wired networks, virtual networks, software defined networks, data center buses, computing backplanes, or any other type of network, combination of network, or variation thereof. A user may utilize its user computing device to access a front-end (e.g., graphical user interface) of an application/service through the communication network 104.

An exemplary application/service may be any type of programmed software designed to perform a group of coordinated functions, tasks, or activities for the benefit of the user. An exemplary application/service provides a user interface that enables users to access content (e.g., word processing content, notes content, presentation content spreadsheet content, webpages, photo content, audio content, video, handwritten input, social networking content). An example of an application/service is a productivity application/service. An exemplary productivity service 106 is software configured for execution to enable users to complete tasks through a computing device, where exemplary productivity services may be configured for access to content including content retrieved via a network connection (e.g., Internet, Bluetooth®, infrared). Examples of productivity services 106 comprise but are not limited to: word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, digital assistant services, directory applications/services, mapping services, calendaring services, electronic payment services, digital storage applications/services and social networking applications/services, among other examples. In some examples, an exemplary productivity service 106 may be a component of a suite of productivity applications/services that may be configured to interface with other applications/services associated with an application platform. For example, a word processing service may be included in a bundled service (e.g. Microsoft® Office365® or the like). Further, an exemplary productivity service 106 may be configured to interface with other internet sources/services including third-party application/services, for example, to enhance functionality of the productivity service 106.

The productivity service 106 is configured to enable a user to access a digital document (or digital documents) through a graphical user interface (GUI). An exemplary digital document is a representation of content in an electronic media/electronic format such as a file. Examples of digital documents (or electronic documents) are known to one skilled in the field. For instance, a digital document may be a word processing file that comprises authored content. Digital documents may be accessed natively, through applications stored on the user computing device. In alternate examples, digital documents may be accessed over a network connection, for example, where a digital document is a web page accessed through a web browser or a distributed copy of a document that is being accessed but is remotely stored on a data storage other than the user computing device. A GUI of an exemplary productivity service 106 is configured to enable review of digital documents. An exemplary GUI of a productivity service 106, is adapted to comprise advanced writing assistance functionality that enables generation and surfacing of user-specific contextual insights as described in the present disclosure. Visual examples of advanced writing assistance functionality, including generated user-specific contextual insights, are provided in FIGS. 3A-3E and the accompanying description. In some examples described herein, a user may obtain direct access to exemplary user-specific contextual insights upon access to a productivity service 106. In other examples, exemplary user-specific contextual insights may be provided to a user when a digital document is accessed or when a user executes an action to select user interface features (e.g., through an application command control/ribbon, voice command, hot key) to obtain writing assistance functionality. In alternative instances, an exemplary productivity service 106 (or suite of productivity services of an application platform) is configured to provide, through an operating system (OS) of a computing device, notification of user-specific contextual insights for content that a user has authored or contributed to. The productivity service 106 interfaces with other applications/services of an exemplary application platform (e.g., Microsoft®, Google®, Apple®) and/or third-party applications/services to enhance functionality, processing efficiency and usability of the productivity service 106. Among other such applications/services, the productivity service 106 interfaces with a storage service 108 and a contextual insight generation service 110.

An exemplary storage service 108 is configured to manages creation and sharing of digital documents associated accessible through one or more productivity services such as productivity service 106. For instance, storage service 108 shares or otherwise distributes digital documents files or access to files to users and also supplies signaling, to the productivity service 106, for the creation and management of access to digital documents. The storage service 108 may comprise physical or virtual data storage as known to one skilled in the field of art. In one example, the storage service 108 is a distributed data storage (e.g., cloud-based data storage) where files are stored remotely and accessed over a distributed network. An exemplary storage service may comprise a plurality of storage directories, where files may be managed on one or more levels (e.g., user-level, group level, application, level). In further examples, the storage service 108 is also configured to store data pertaining to tracking of rewards related to generated user-specific contextual insights as well as user-specific contextual insights (which may be re-used at subsequent time durations).

Furthermore, the storage service 108 also manages data used for generation of exemplary user-specific contextual insights. An exemplary application/service is configured to interface with the productivity service 106 to collect specific telemetry data across digital documents in which a user authored or contributed to. Specific telemetry data may vary depending on the type of productivity service in which content is being generated. Examples of such data comprise writing assistance telemetry data. Writing assistance telemetry data comprises, evaluating, for the user(s), spelling, grammar and a writing style across content of one or more digital documents. User-specific insight analytics are generated for the user(s) based on analysis of the writing telemetry data. Examples of specific writing assistance telemetry data that may be collected and analyzed comprise but are not limited to: spelling errors that were autocorrected; grammar and punctuation errors and corrections; time spent proofreading, editing, reviewing, etc.; overall time saving through automatic proofing, most common errors, etc.); sentence structure evaluation; vocabulary choices; use of formal language; active and passive language evaluation; inclusive language evaluation; clarity and conciseness; comments and analysis by other users; access to digital documents of other users; access to a user's digital documents by other users; use of online dictionaries; use of team-specific terminology/acronyms; use of abbreviations, icons, etc.; and analytics on specific content included in a digital document such as words or phrases, among other examples.

Writing assistance telemetry data on users' spelling, grammar and writing style may be aggregated and analyzed over a given period of time. In this way, a rich base of user-specific information is built to introduce, through applications/services, advanced writing assistance that is contextually relevant for a user. Exemplary writing assistance telemetry data can be pivoted and analyzes along several dimensions comprising but not limited to: top auto-corrections; time taken to proof a given document and address all errors; time saving from leveraging auto-correct and auto-replace features; commonly made mistakes; proofing corrections from users in the same organization (e.g., tenant-wide insights); suggested tips for improving writing style, grammar, spelling, punctuation, etc.; and analytics on user strengths and weaknesses of writing assistance telemetry data, among other examples. An exemplary storage service 108 may further leverage assets across an exemplary application platform or within an organization (such as their company dictionaries, commonly used acronyms in their team documents, etc.). For instance, the storage service 108 may be configured to manage user account data for access to an exemplary application platform, subscription service, productivity application/service, which the contextual insight generation service 110 may utilize to generate user-specific insights. Any such data may be accessed and analyzed by a contextual insight generation service 110 for generation of exemplary user-specific contextual insights.

The contextual insight generation service 110 comprises one or more components that are used to generate the user-specific contextual insights. Exemplary user-specific contextual insights are utilized to provide advanced writing analysis, which contextually analyzes content of a user individually and/or in comparison with other users of exemplary applications/services. An exemplary contextual insight generation service 110 is configured to interface with the storage service 108 to access exemplary writing assistance telemetry data, user account data, etc., which enables generation of exemplary user-specific contextual insights. In one example, the contextual insight generation service 110 interfaces with the productivity service 106 to obtain signal data that may assist with generation of user-specific contextual insights in real-time or near real-time. For instance, session data or log data for access to the productivity service 106 by one or more users may be leveraged to generate user-specific insights that can be surfaced to the user when a user accesses the productivity service 106 (or even through a different modality such as message/email, etc., that is linked with a user account of an application platform). This may assist the contextual insight generation service 110 with generating contextually relevant insights such that are user-specific, group/team-specific and/or digital document specific, among other examples.

As referenced above, the contextual insight generation service 110 generates user-specific contextual insights to provide users with writing assistance such as improving spelling, grammar and writing style of digital documents created through exemplary applications/services. User-specific contextual insights comprise data and analytics that provide the user with an intuitive and deeper understanding of the content that they generate. Exemplary contextual insights may be generated across one or more digital documents of the user, a group/team of users and types of applications/services, among other examples. In one example, contextual insights may be generated that represent proficiency scoring of user's writing habits to help users get an understanding of their strengths, weaknesses and patterns in their writing. Moreover, exemplary user-specific contextual insights may be generated for specific time durations (e.g., documents in the last day, week, month, year), where an exemplary representation of a user interface pane or menu for generated insights may comprise insights and analytics for different time durations across digital documents of the user. As an example, contextual insights may be generated and presented that highlight top errors/corrections over a certain pre-defined duration of time. In further instances, exemplary contextual insights may provide comparative analytics, which may compare a user's writing style, spelling, grammar, etc., with that of other users of an application/service. For example, a user may be a member of a group/team of users, where exemplary writing assistance telemetry data may be used to identify strengths and weaknesses of users as compared with other members of a group/team. In additional examples, exemplary contextual insights may be generated from analysis of writing assistance telemetry data across a plurality of users, for example, to determine common best practices across users of an application/service, team of users or organization, among other examples. Such insights may be shared with other users across the application/service or other applications/services associated with an application platform. Exemplary user-specific contextual insights may comprise insights or analytics on any of the above defined writing assistance telemetry data, as well scoring/ranking of proficiency for users, comparative scoring/ranking across a plurality of users, comparative analytics on user writing over different period of time, and suggested tips for improving user writing, among other examples. Further, visual examples of user-specific contextual insights are provided in FIGS. 3A-3E, which provide examples of an adapted and improved graphical user interface (GUI).

User-specific contextual insights may be generated in real-time or near real-time. In one example, user-specific contextual insights are generated while a user is offline and presented through a user interface of an application/service when the user returns online. In another example, user-specific contextual insights are generated while the user is actively engaging an application/service. For instance, user-specific contextual insights may be generated for a digital document that a user is accessing through an exemplary application/service. Presentation of exemplary user-specific contextual insights may occur through any of a plurality of different triggers. In one example, presentation of exemplary user-specific contextual insights occurs automatically, on behalf of a user, when a digital document is displayed through a user interface of an application/service. In another example, presentation of exemplary user-specific contextual insights occurs automatically, on behalf of a user, when an update to content of a digital document is detected. In yet another example, a user may select, through a user interface of an application/service, an application control feature for execution of a review action (e.g., spelling and grammar check, proofreading, online dictionary or thesaurus access, comments, track changes), where presentation of exemplary user-specific contextual insights occurs automatically, on behalf of a user, when the selection of the review action is detected. In some examples, an exemplary user interface is configured to provide a user with a notification that indicates to the user that user-specific insight analytics have been generated. In such examples, an action associated with selection of the notification may be a trigger for presentation of the user-specific contextual insights. In one example, exemplary user-specific contextual insights are presented through a pop-up user interface pane in a user interface of an application/service. In alternative instances, user-specific contextual insights may be individual presented, for example, as pop-up notifications, callout user interface features, etc.

In generating the user-specific contextual insights, the contextual insight generation service 110 may be configured to employ a machine-learning model (or neural network model) that is configured to analyze exemplary writing assistance telemetry data and select content that may be most relevant for a context in which the user is (or has been) utilizing the productivity service 106. Creation of an exemplary machine learning model is known to one skilled in the field of art. An exemplary insight generation model (e.g., machine-learning model) is configured to analyze inputs that comprise writing assistance telemetry data, application/service-specific signal data (e.g., identifying context of user usage of an application/service) and user account data including groups/teams/affiliations of a user, among other examples. The insight generation model is trained to generate user-specific contextual insights based on machine-learning processing that analyzes the input data. Processing operations, for training of a machine learning model are known one skilled in the field of art. As an example, training data may comprise user content (e.g., digital documents), application-specific data and exemplary writing assistance telemetry data.

In some instances, the insight generation model may be configured to generate new analytics based on writing assistance telemetry data. For example, analysis of writing assistance telemetry data may comprise generation of metrics for data such as: the number of spelling errors, the number of run-on sentences, the amount of time spent reviewing a digital document, the number of proper names, how often an auto-correct feature was utilized, how often a user utilizes active or passive voice in their sentences, number of punctuation errors, number of grammar errors, etc. An exemplary insight generation model is configured to take this raw metric data and transform that into contextual insights and/or contextual analytics that provide a deeper understanding for the user. For instance, a traditional review tool like spell check may simply use raw telemetric data (e.g., the number of words spelled incorrectly in a document) and present that to the user. While this has some benefit, such analysis may not help the user understand an error that they are making or identify ways the user can improve its writing and grammar. As an example, the insight generation model may take a raw spelling analytic (like number of errors), compare that metric across other digital documents authored by the user and generate insights that show patterns of how the user is writing over specific durations (e.g., document vs. document, across documents in the last month, year, etc.). In another instance, the insight generation model is configured to dig deeper and may be used to analyze specific words that the user has spelled wrong across different documents. In such an example, an analytic may be generated, by the insight generation model, that may help the user avoid the same errors in the future. For instance, the insight generation model may be configured to evaluate session data of applications/services, where the user was authoring/editing a digital document, to identify specific context in which the spelling errors were made. The present disclosure is not limited to the spelling errors examples provided above. It is to be understand that the insight generation model may utilize writing assistance telemetry data of any kind (e.g., spelling, grammar, writing style) to transform raw telemetric data into exemplary insights and analytics. In another example, raw grammar-based telemetric data may indicate an aggregate number of words that a user has used in a digital document. That metric may be compared across other digital documents authored by the user, where the insight generation model may generate an insight analytic to indicate a level of wordiness in the user's writing. Taking generation of exemplary user-specific contextual insights a step further, the insight generation model may be configured to generate a graphical representation of this transformed metric. In further examples, another transformed metric may be created that illustrates wordiness of a user's writing as compared with other users (e.g., in a team or group).

In other instances, generation of user-specific contextual insights comprise selection of specific writing assistance telemetry data, which may be modified to fit a formatting and layout for presentation for presentation in a GUI. In at least one example, the insight generation model is configured to generate contextual insights across different categories/classifications, for example, to vary the scope of the contextual insights that are presented through a GUI. For instance, insights may comprise data and/or analytics of any of the following types: spelling, grammar, writing style improvements, knowledge related to user activity and interactions, data and/or knowledge contributed to usage across applications/services, support tips, best practices and status of rewards/achievements, among other examples. In some examples, an exemplary insight generation model may be further configured to execute ranking/filtering processing to select content that is to be presented through a user interface of an exemplary application/service. Ranking processing for machine learning modeling is known to one skilled in the field of art. Any number of user-specific contextual insights may be selected for output without departing from the spirit of the present disclosure. In examples, presentation of user-specific contextual insights may be updated at different time intervals, when new content is authored by a user, when new tips or best practices are developed and when new content is authored by other users of a group/team, among other examples. In such instances, an exemplary insight generation model may be configured to output a plurality of user-specific contextual insights that an exemplary application/service may rotate through presentation of its GUI to keep the content fresh and dynamic.

In further examples, an exemplary contextual insight generation service 110 is configured to enable gamification of user-specific contextual insights. In one example, an exemplary insight generation model is configured to manage gamification of user-specific contextual insights. In alternative examples, the contextual insight generation service 110 may be configured to implement an application programming interface (API), data model, machine-learning data model, etc., for gamification management related to user-specific contextual insights. Gamification processing may be implemented across exemplary applications/services to incentive users to improve their writing style as well as share contextual insights with other users. Gamification for advanced writing analysis aims to celebrate users' good writing skills and help them leverage the best writing habits of their peers. In some examples, rewards may be issued to a user, for example, based on actions by the user. Examples of actions that may result in a user earning rewards may comprise but are not limited to: earning high proficiency scoring with respect to spelling, grammar and user writing style; adding content to online repositories, dictionaries, etc.; generation of contextual insights from user content and/or user behaviors; sharing insights with other users; utilizing insights provided by other users; and improving spelling, grammar and/or writing style across digital documents of a user, among other examples. In one example, gamification comprises ranking users in comparison with other users of an application/service including with specific groupings (e.g., team-specific, age specific, within specific durations of time). In some instances, rewards are may be prizes (e.g., consumer products from an organization, company, etc.). In managing gamification of user-specific contextual insights, the contextual insight generation service 110 may interface with any of the productivity service 106, an OS and/or a GUI for an application/service that manages user account data, for example, to enable user status with respect to gamification. Further, the contextual insight generation service 110 may further be configured to interface with the storage service 108 to obtain user account data and application-specific data. In further examples, the storage service 108 is also configured to store data pertaining to tracking of rewards for user-specific contextual insights as well as user-specific contextual insights (which may be re-used at subsequent time durations).

Furthermore, the contextual insight generation service 110 interfaces with the productivity service 106 for presentation of generated user-specific contextual insights through a GUI of the productivity service 106. The productivity service 106 presents/surfaces user interface features (e.g., panes, menus, notifications) that enable the user-specific contextual insights to be highlighted for a user. For instance, the productivity service 106 may receive the user-specific contextual insights, generated by the contextual insight generation service 110, and propagate, to the user computing device, data necessary for display through a GUI of the productivity service 106. Data protocols for communication between applications/services, including requests and responses, is known to one skilled in the field of art.

As referenced above, in one example, exemplary user-specific contextual insights are presented through a pop-up user interface pane in a user interface of an application/service. For example, a user interface of the productivity service 106 may be adapted to enable menu-based display of user-specific contextual insights. Moreover, an exemplary GUI of the productivity service 106 may further be configured to enable a user to filter through different types of contextual insights, for example, through touch input, voice input or device input. In alternative instances, user-specific contextual insights may be individual presented, for example, as pop-up notifications, callout user interface features, etc.

Figure 2:
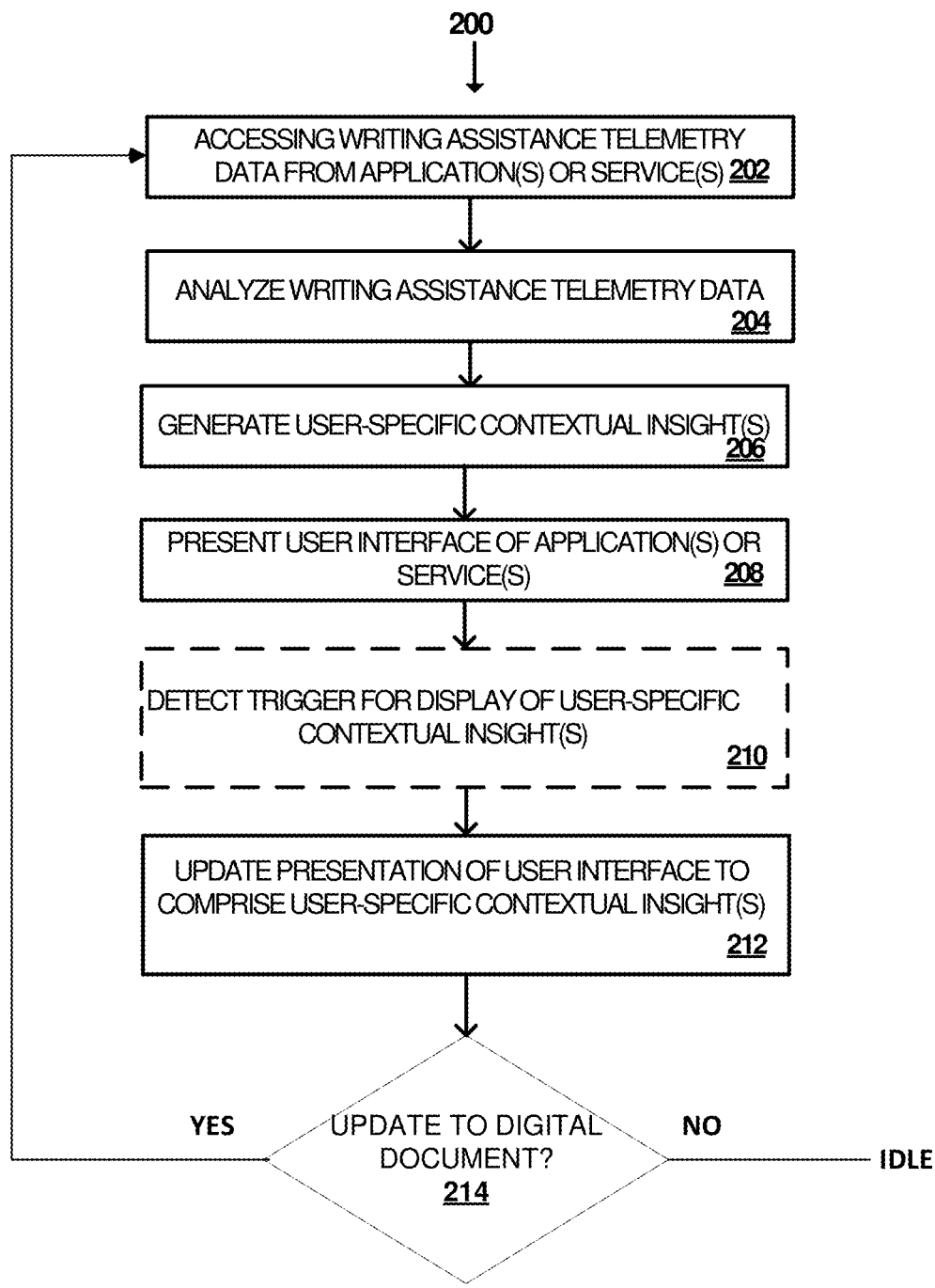
FIG. 2 illustrates an exemplary method related to generation and surfacing of user-specific contextual insights, with which aspects of the present disclosure may be practiced.

FIG. 2 illustrates an exemplary method 200 related to generation and surfacing of user-specific contextual insights, with which aspects of the present disclosure may be practiced. Processing operations described in method 200 may be executed by components described in process flow 100 (FIG. 1), where the detailed description in process flow 100 supports and supplements the recited processing operations in method 200. Interfacing and communication between exemplary components, such as those described in process flow 100, are known to one skilled in the field of art. For example, data requests and responses may be transmitted between applications/services to enable specific applications/services to process data retrieved from other applications/services. Formatting for such communication may vary according to programmed protocols implemented by developers without departing from the spirit of this disclosure.

Figure 4:
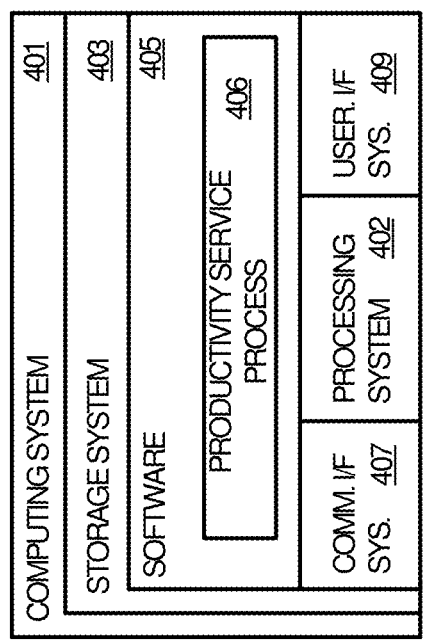
FIG. 4 illustrates a computing system suitable for implementing processing of an exemplary productivity service process that is used to generate and/or present exemplary user-specific contextual insights, with which aspects of the present disclosure may be practiced.

As an example, method 200 may be executed across an exemplary computing system (or computing systems) as described in the description of FIG. 4. Exemplary components, described in method 200, may be hardware and/or software components, which are programmed to execute processing operations described herein. Operations performed in method 200 may correspond to operations executed by a system and/or service that execute computer programs, software agents, intelligent bots, application programming interfaces (APIs), neural networks and/or machine-learning processing, among other examples. In some examples, processing operations described in method 200 may be executed by one or more applications/services associated with a web service that has access to a plurality of application/services, devices, knowledge resources, etc. In one instance, processing operations described in method 200 may be implemented by one or more components connected over a distributed network.

Method 200 begins at processing operation 202, where writing assistance telemetry data is accessed from exemplary applications/services. As referenced in the description of process flow 100 (FIG. 1), exemplary writing assistance telemetry data may be collected for user authored digital documents across any of a plurality of applications/services. In one example, the writing assistance telemetry data may be managed by a separate application/service, associated with an application platform. In another example, the writing assistance telemetry data is stored in a data storage of an exemplary storage service (e.g., storage service 108 of FIG. 1), for example, a data storage that is associated with an exemplary application/service such as a productivity service.

Flow of method 200 may proceed to processing operation 204, where the accessed writing assistance telemetry data is analyzed. Analysis (processing operation 204) of the writing assistance telemetry data may comprise aggregating the writing assistance telemetry data to one or more data levels. Aggregation of the writing assistance telemetry data may improve efficiency during generation of exemplary user-specific contextual insights. Examples of levels of aggregation for the writing assistance telemetry data may comprise but is not limited to: a user-specific level, an application-specific level, a team/group level, among other examples. Furthermore, the writing assistance telemetry data may be sub-aggregated, amongst those levels, based on further criteria such as: time duration, category/classification, similarity/relevance, threshold groupings (e.g., user has a number of low proficiency areas or high proficiency areas). In some examples, exemplary writing assistance telemetry data may be raw telemetric data as described in the foregoing description. As described in process flow 100 (FIG. 1), an exemplary insight generation model, may transform raw telemetric data into a richer or deeper insight. In one example, processing operation 204 may comprise aggregating similar or relevant metrics (e.g., spelling, grammar, writing style) across exemplary writing assistance telemetry data. This may further be done at the aggregated levels (e.g., user level, group level). Doing so, may assist an exemplary insight generation model with transformation of raw telemetric data into richer insights and analytics.

In processing operation 206, exemplary user-specific contextual insights are generated. Exemplary user-specific contextual insights are generated (processing operation 206) for the user based on an analysis (processing operation 204) of the writing assistance telemetry data. Exemplary user-specific contextual insights as well as generation of user-specific contextual insights have been described in the foregoing description including the description of process flow 100 (FIG. 1). User-specific contextual insights comprise data and analytics that provide the user with an intuitive and deeper understanding of the content that they generate. For example, processing operation 206 may comprise transforming raw writing assistance telemetry data into richer contextual insights. Exemplary contextual insights may be generated across one or more digital documents of the user, a group/team of users and types of applications/services, among other examples. Visual examples of user-specific contextual insights are provided in FIGS. 3A-3E, which provide examples of an adapted and improved graphical user interface (GUI).

In one example, generation of exemplary user-specific contextual insights comprises: generation of at least one analytic analyzing a writing style of the user across a specific digital document of the productivity service. In further examples, generation of exemplary user-specific contextual insights comprises: generation of least one insight analytic analyzing the writing style of the user across a plurality of digital documents of the productivity service. In additional examples, exemplary contextual insights may be generated from analysis of writing assistance telemetry data across a plurality of users, for example, to determine common best practices across users of an application/service, team of users or organization, among other examples. Such insights may be shared with other users across the application/service or other applications/services associated with an application platform. As another example, processing operation 206 may comprise generating at least one comparative insight analytic that compares the writing style of the user with writing styles of the plurality of other users. Such analytics may enable a user to gauge how proficient they are in comparison with other users including other members of a team or organization.

In yet another example, processing operation 206 may comprise generating spelling insight analytics and/or grammar insight analytics. As referenced in the foregoing description, generation of spelling insight analytics, grammar insight analytics and/or writing style analytics may comprise transformation of raw telemetric data into a richer context.

Flow of method 200 may proceed to processing operation 208, where an exemplary user interface (e.g., GUI) is presented for an exemplary application/service. As referenced in the foregoing description, generation of user-specific contextual insights may occur offline (or near-real-time). In such examples, processing operations 202-208 may occur while a user is not actively accessing an exemplary productivity service, but generated user-specific contextual insights may be ready to display through a user interface when the user access the productivity service or are sent through a user interface of a different application/service (e.g., pop-up notification through OS, email/SMS). In other examples, a user may be actively accessing an exemplary productivity service, where the user interface for that productivity service may be presented.

In processing operation 210, a trigger for display of exemplary user-specific contextual insights is detected. Detection of exemplary triggers have been previously described in the foregoing description including the description of process flow 100 (FIG. 1). Detection of an exemplary trigger may occur through tracking of application-specific session data for a user. In one example, an exemplary API may enable an exemplary contextual insight generation service to interface with exemplary productivity services and associated storage services. Detection of a trigger may cause propagation of generated user-specific contextual insights for update of a user interface of the productivity service.

When an exemplary trigger is detected, flow of method 200 may proceed to processing operation 212. At processing operation 212, presentation of the user interface is updated with the generated user-specific contextual insights. Presentation of exemplary user-specific contextual insights has been described in the foregoing description including the description of process flow 100 (FIG. 1). In one example, exemplary user-specific contextual insights are presented through a pop-up user interface pane in a user interface of an application/service. In alternative instances, user-specific contextual insights may be individual presented, for example, as pop-up notifications, callout user interface features, etc. Users may interact with a user computing device to navigate through exemplary user interface features related to generated user-specific contextual insights. Exemplary user-specific contextual insights may further comprise rich interactive data objects, for example, as illustrated in FIGS. 3B-3E. This may further differentiate from traditional telemetric data for writing assistance, providing users with deeper contextual understanding from a displayed analytic.

Flow of method 200 may proceed to decision operation 214, where it is determined whether the user makes an update to content of a digital document. In examples where no update occurs, flow of decision operation 214 branches NO and processing of method 200 remains idle. In some alternative examples, an exemplary productivity service is configured to interface with an exemplary contextual insight generation service to automatically update presentation of user-specific contextual insights after a predetermined amount of time has passed (e.g., idle time). In examples where the user updates content of a digital document, flow of decision operation 214 branches YES and processing of method 200 returns back to processing operation 202. Exemplary writing assistance telemetry data may be continuously updated in real-time or near real-time, where new user-specific contextual insights may be generated and presented on behalf of a user.

FIGS. 3A-3E illustrate exemplary processing device views providing user interface examples of a productivity service that comprises user interface features for user-specific contextual insights, with which aspects of the present disclosure may be practiced. Processing operations described in process flow 100 (FIG. 1) and method 200 (FIG. 2) support and supplement back-end processing used for generation of exemplary processing device views shown in FIGS. 3A-3E.

FIG. 3A illustrates processing device view 300, illustrating an interaction with user, through a user computing device, and an exemplary productivity service. A non-limiting example of an exemplary productivity service is a word processing service that is displaying a digital document 302, which a user is editing. Processing device view 300 illustrates display of an exemplary notification 304 that indicates to the user that user-specific insight analytics have been generated. As described in the foregoing description, an exemplary notification 304 may be automatically generated and presented on behalf of a user when a trigger for update of user-specific contextual insights is detected or a new user-specific contextual insight is generated and available for a user to review. In the example shown, a user may execute an action 306 that selects the notification 304.

FIG. 3B illustrates processing device view 320, illustrating an example of an exemplary pop-up user interface pane 322 displaying contextual insights for a user through a user interface of a productivity service. In one instance, processing device 320 is a continued example, from processing device view 300 (FIG. 3A), where the pop-up user interface pane 322 is automatically displayed in response to the action 306 selecting notification 304. In another example, pop-up user interface pane 322 is displayed when a user makes a selection from an application command control (e.g., a selection of a user interface feature from a review tab). In one example, the user may obtain a variety of different review analytics without having to execute a plurality of individual review actions (or user interface selections) through the user interface of an exemplary productivity service. The pop-up user interface pane 322 comprises a plurality of contextual insights including a first insight 322 indicating high level overview of spelling and grammar corrections; a second insight 326 providing a high-level overview of user writing style improvements; and a third insight 328 providing a contextual insight into content that was identified in the user's digital document 302, which was added to an organization online dictionary. Further, third insight 328 illustrates comprises rich data objects, for example, where the user can select a link in the generated insight to learn additional context about that insight. For instance, additional context for the third insight 328 may be which 15 words were added to the library from the user's authoring.

Figure 3C:
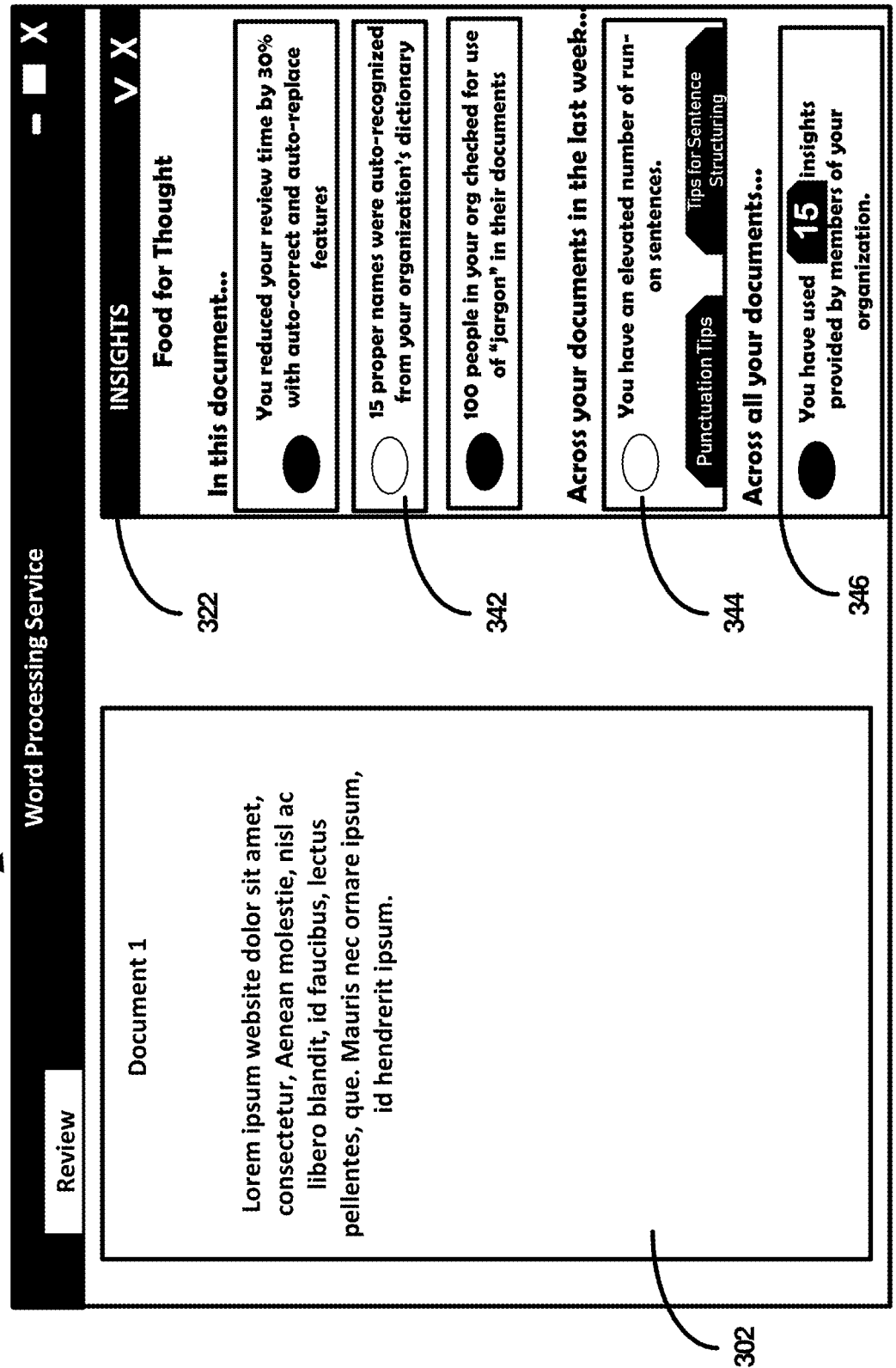

FIG. 3C illustrates processing device view 340, illustrating another example of an exemplary pop-up user interface pane 322 displaying contextual insights for a user through a user interface of a productivity service. In the example show in processing device view 340, various contextual insights are generated for different durations. For example, a first insight 342 is shown that displays generated user-specific contextual insights, which are specific to the displayed digital document 302. A second insight 344 is shown that displays generated user-specific contextual insights across a user's digital documents that have been created in a time duration of the previous week. A third insight 346 is shown that displays generated user-specific contextual insights across all of the user's digital documents.

FIG. 3D illustrates processing device view 360, illustrating another example of an exemplary pop-up user interface pane 322 displaying contextual insights for a user through a user interface of a productivity service. Processing device view 360 provides rich data analytics as compared with traditional raw writing assistance telemetry data. A first insight 362 and a second insight 364 are displayed, where such insights provide users with tips to enhance a user's writing. For example, the first insight 362 provides a comparative analysis of a user's writing style with that of other users in the user's organization. The second insight 364 identifies issues (weaknesses) in a user's writing style based on telemetric analysis that is deepened through application of an exemplary insight generation model, which is described in the foregoing description. As can be seen in processing device view 360, raw telemetry data is not only furthered through greater contextual analysis but also transformed into a graphical representation on behalf of the user. This may assist in driving the point home to the user.

Figure 3E:
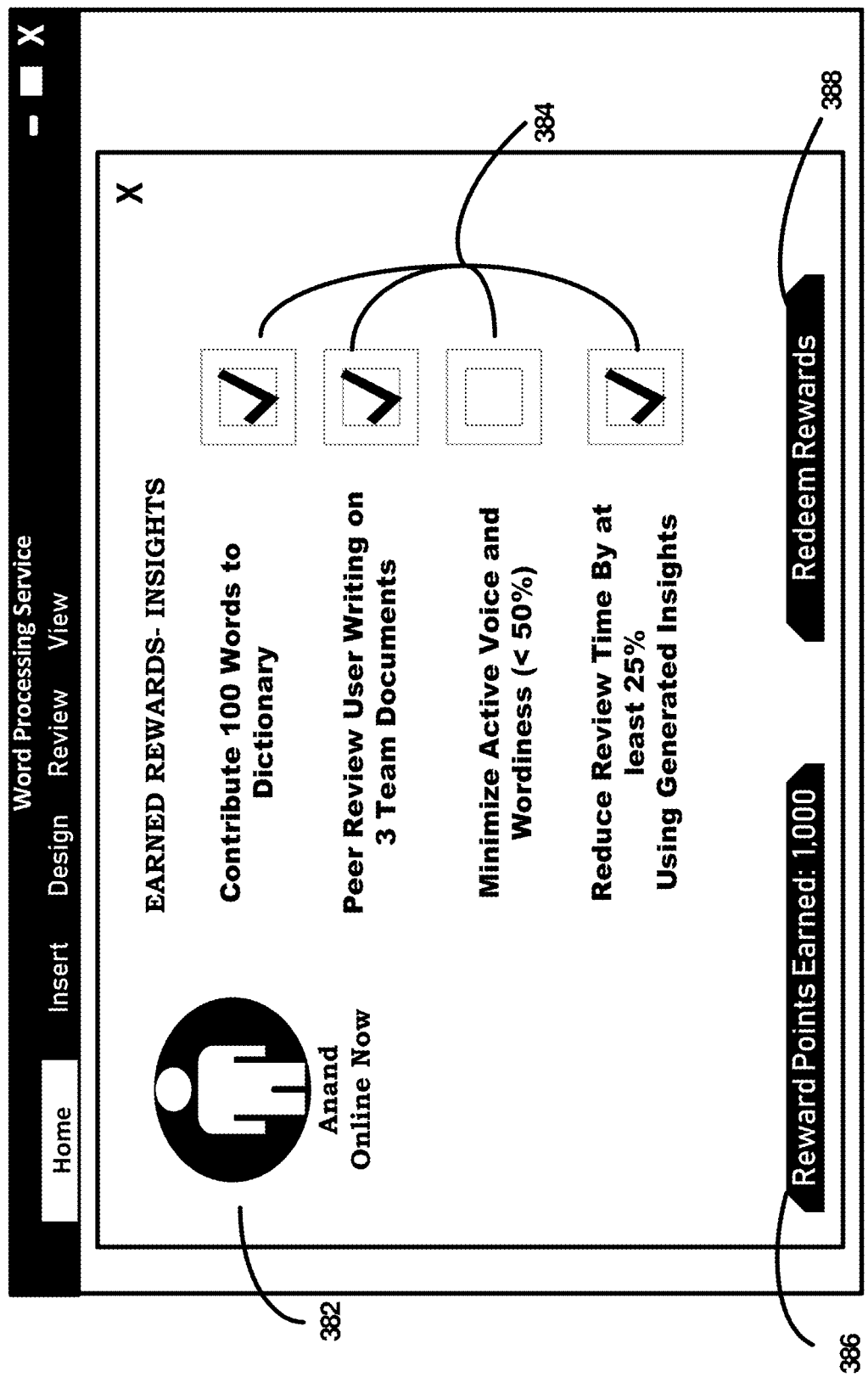

FIG. 3E illustrates processing device view 380, illustrating an alternative example of gamification associated with provision of user-specific contextual insights. Gamification, as related to provision of user-specific contextual insights, has been described in the foregoing description. In examples described herein, gamification may relate to techniques that help make users better writers by leveraging the power of contextual insights. For instance, contextual insights are generated that celebrate successes of the user's writing style as well as provide constructive feedback in areas where the user can improve. In alternative examples, gamification may further extend to incentivizing user participation. Processing device view 380 illustrates tracking of exemplary rewards for a user profile 382 of an exemplary platform service, which comprises a suite of productivity applications/services. As can be seen in processing device view 380, the user profile 382 has unlocked/earned three achievements from an exemplary achievement listing 384. In the example shown, the user profile 382 has earned reward points, which are identified through a rewards user interface feature 386. As an example, a user may select user interface feature 386 to see a breakdown of rewards earned by the user account 382. As described in the foregoing description, exemplary rewards/achievements may be earned through for proficiency in writing and grammar as well as taking actions that further contextual insight generation. A redemption user interface feature 388 is also displayed. Redemption user interface feature 388 is configured to enable a user to redeem rewards or unlock achievements. Examples of rewards/achievements have been provided in the foregoing description.

FIG. 4 illustrates a computing system 401 that is suitable for implementing processing of an exemplary productivity service process that is used to generate and/or present exemplary user-specific contextual insights. Computing system 401, which is representative of any system or collection of systems in which the various applications, services, scenarios, and processes disclosed herein may be implemented. Examples of computing system 401 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 401 may be implemented as a single apparatus, system, or device or may be implemented in a distributed manner as multiple apparatuses, systems, or devices. For example, computing system 401 may comprise one or more computing devices that execute processing for applications and/or services. Computing system 401 may comprise a collection of devices executing processing for front-end applications/services, back-end applications/service or a combination thereof. Computing system 401 includes, but is not limited to, processing system 402, storage system 403, software 405, communication interface system 407, and user interface system 409. Processing system 402 is operatively coupled with storage system 403, communication interface system 407, and user interface system 409.

Processing system 402 loads and executes software 405 from storage system 403. Software 405 includes applications/service such as a productivity service process 406, that may enable launching of an exemplary productivity service, user interface thereof and access to exemplary user-specific contextual insights. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, graphical processing units, application specific processors, and logic devices, as well as any other type of processing device, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for implementing exemplary productivity service(s), exemplary storage service(s) and an exemplary contextual insight generation service, as described in the foregoing description.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to process note items and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface. User interface system 409 is configured to enable operation of an improved user interface that is adapted for presentation of exemplary user-specific contextual insights.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
presenting, through a productivity service, a user interface;
analyzing writing assistance telemetry data for a user of a productivity service, wherein the writing assistance telemetry data comprises data evaluating spelling, grammar and a writing style across a plurality of digital documents that comprise authored content by the user;
generating user-specific contextual insights for the user based on an analysis of the writing assistance telemetry data, wherein the user-specific contextual insights comprise at least one analytic analyzing a writing style of the user across a specific digital document of the productivity service and at least one insight analytic analyzing the writing style of the user across the plurality of digital documents of the productivity service; and
updating presentation of the user interface with the generated user-specific contextual insights that comprises, displaying through the user interface, the least one analytic analyzing a writing style of the user across a specific digital document of the productivity service and the at least one insight analytic analyzing the writing style of the user across the plurality of digital documents of the productivity service.

2. The method of claim 1, wherein the analyzing of the writing assistance telemetry data further comprises analyzing writing assistance telemetry data for a plurality of other users of the productivity service, and wherein the generating of the user-specific contextual insights further comprises generating at least one comparative insight analytic that compares the writing style of the user with writing styles of the plurality of other users, and wherein the generated user-specific contextual insights, presented through the user interface, comprise the at least one comparative insight analytic.

3. The method of claim 1, wherein the generating of the user-specific contextual insights further comprises generating at least spelling insight analytic based on the analysis of the writing assistance telemetry data and generating at least one grammar insight analytic based on the analysis of the writing assistance telemetry data.

4. The method of claim 3, wherein the generating of the at least spelling insight analytic comprises detecting one or more new words from the plurality of digital documents through a comparison with an online dictionary of the productivity service, sharing the one or more new words with the online dictionary, and wherein the spelling insight analytic identifies that the one or more words are shared with the online dictionary.

5. The method of claim 1, wherein the updating of the presentation of the user interface with the generated user-specific contextual insights occurs based on a trigger of detecting that a digital document is displayed through the user interface of the productivity service.

6. The method of claim 1, further comprising: detecting an update to content of a digital document through interaction with the user interface, and wherein the updating of the presentation of the user interface with the generated user-specific contextual insights occurs based on the detecting of the update to the content of the digital document.

7. The method of claim 1, further comprising: detecting a selection of a review action of a digital document through the user interface of the productivity service, and wherein the updating of the presentation of the user interface with the generated user-specific contextual insights occurs when the selection of the review action is detected.

8. The method of claim 1, further comprising: automatically surfacing, through the user interface on behalf of the user, a notification identifying generation of the user-specific contextual insights, receiving a selection of the notification and wherein the updating of the presentation of the user interface occurs based on the selection of the notification.

9. The method of claim 1, wherein the updating of the presentation of the user interface further comprises presenting the generated user-specific contextual insights in a pop-up user interface pane separate from a digital document.

10. A system comprising:
at least one processor; and
a memory, operatively connected with the at least one processor, storing computer-executable instructions that, when executed by the at least one processor, causes the at least one processor to execute processing operations that comprise:
presenting, through a productivity service, a user interface;
analyzing writing assistance telemetry data for a user of a productivity service, wherein the writing assistance telemetry data comprises data evaluating spelling, grammar and a writing style across a plurality of digital documents that comprise authored content by the user;
generating user-specific contextual insights for the user based on an analysis of the writing assistance telemetry data, wherein the user-specific contextual insights comprise at least one analytic analyzing a writing style of the user across a specific digital document of the productivity service and at least one insight analytic analyzing the writing style of the user across the plurality of digital documents of the productivity service; and
updating presentation of the user interface with the generated user-specific contextual insights that comprises, displaying through the user interface, the least one analytic analyzing a writing style of the user across a specific digital document of the productivity service and the at least one insight analytic analyzing the writing style of the user across the plurality of digital documents of the productivity service.

11. The system of claim 10, wherein the analyzing of the writing assistance telemetry data further comprises analyzing writing assistance telemetry data for a plurality of other users of the productivity service, and wherein the generating of the user-specific contextual insights further comprises generating at least one comparative insight analytic that compares the writing style of the user with writing styles of the plurality of other users, and wherein the generated user-specific contextual insights, presented through the user interface, comprise the at least one comparative insight analytic.

12. The system of claim 10, wherein the generating of the user-specific contextual insights further comprises generating at least spelling insight analytic based on the analysis of the writing assistance telemetry data and generating at least one grammar insight analytic based on the analysis of the writing assistance telemetry data.

13. The system of claim 12, wherein the generating of the at least spelling insight analytic comprises detecting one or more new words from the plurality of digital documents through a comparison with an online dictionary of the productivity service, sharing the one or more new words with the online dictionary, and wherein the spelling insight analytic identifies that the one or more words are shared with the online dictionary.

14. The system of claim 10, wherein the updating of the presentation of the user interface with the generated user-specific contextual insights occurs based on a trigger of detecting that a digital document is displayed through the user interface of the productivity service.

15. The system of claim 10, wherein the processing operations, executed by the at least one processor, further comprise detecting an update to content of a digital document through interaction with the user interface, and wherein the updating of the presentation of the user interface with the generated user-specific contextual insights occurs based on the detecting of the update to the content is of the digital document.

16. The system of claim 10, wherein the processing operations, executed by the at least one processor, further comprise detecting a selection of a review action of a digital document through the user interface of the productivity service, and wherein the updating of the presentation of the user interface with the generated user-specific contextual insights occurs when the selection of the review action is detected.

17. The system of claim 10, wherein the processing operations, executed by the at least one processor, further comprise automatically surfacing, through the user interface on behalf of the user, a notification identifying generation of the user-specific contextual insights, receiving a selection of the notification and wherein the updating of the presentation of the user interface occurs based on the selection of the notification.

18. The system of claim 10, wherein the updating of the presentation of the user interface further comprises presenting the generated user-specific contextual insights in a pop-up user interface pane separate from a digital document.

19. A computer-readable storage media storing computer-executable instructions that, when executed by at least one processor, causes the at least one processor to execute a method comprising:

presenting, through a productivity service, a user interface;

analyzing writing assistance telemetry data for a user of a productivity service, wherein the writing assistance telemetry data comprises data evaluating spelling, grammar and a writing style across a plurality of digital documents that comprise authored content by the user;

generating user-specific contextual insights for the user based on an analysis of the writing assistance telemetry data, wherein the user-specific contextual insights comprise at least one analytic analyzing a writing style of the user across a specific digital document of the productivity service and at least one insight analytic analyzing the writing style of the user across the plurality of digital documents of the productivity service; and updating presentation of the user interface with the generated user-specific contextual insights that comprises, displaying through the user interface, the least one analytic analyzing a writing style of the user across a specific digital document of the productivity service and the at least one insight analytic analyzing the writing style of the user across the plurality of digital documents of the productivity service.

20. The computer-readable storage media of claim 19, wherein the analyzing of the writing assistance telemetry data further comprises analyzing writing assistance telemetry data for a plurality of other users of the productivity service, and wherein the generating of the user-specific contextual insights further comprises generating at least one comparative insight analytic that compares the writing style of the user with writing styles of the plurality of other users, and wherein the generated user-specific insight analytics, presented through the user interface, comprise the at least one comparative insight analytic.

* * * * *